United States Patent [19]

Williamson

[11] Patent Number: 5,076,616
[45] Date of Patent: Dec. 31, 1991

[54] HYDRAULIC FITTING WITH O-RING SEAL END STOP

[75] Inventor: Nigel D. L. Williamson, Sheffield, England

[73] Assignee: NWD International, Inc., Fort Wayne, Ind.

[21] Appl. No.: 520,537

[22] Filed: May 8, 1990

[51] Int. Cl.$^5$ .............................................. F16L 35/00
[52] U.S. Cl. ................................. 285/332.3; 285/349
[58] Field of Search .............. 285/334.5, 332.2, 332.3, 285/332, 349, 386

[56] References Cited

U.S. PATENT DOCUMENTS

| | | | |
|---|---|---|---|
| 587,347 | 8/1897 | Waite | 285/332.2 |
| 1,800,753 | 4/1931 | Replogle | 285/332.2 X |
| 2,381,829 | 8/1945 | Livers | 285/332.2 |
| 2,775,471 | 12/1956 | Douglass | 285/334.5 X |
| 3,291,442 | 12/1966 | Cranage | 285/332.3 X |
| 4,209,193 | 6/1980 | Ahlstone | 285/332.3 X |

FOREIGN PATENT DOCUMENTS

| | | | |
|---|---|---|---|
| 1141975 | 9/1957 | France | 285/334.5 |
| 25999 | of 1905 | United Kingdom | 285/334.5 |
| 1232938 | 5/1971 | United Kingdom | 285/334.5 |

Primary Examiner—Dave W. Arola
Assistant Examiner—Heather Chun
Attorney, Agent, or Firm—Baker & Daniels

[57] ABSTRACT

The present invention is a hydraulic coupling with an O-ring seal and a stop wall. The O-ring sealing works conventionally to provide a hydraulic seal, while the stop wall limits the range of adjustment for the male fitting. The male fitting is prevented from further inward axial movement because of the abutment of the stop wall with the annular edge of the fitting.

11 Claims, 1 Drawing Sheet

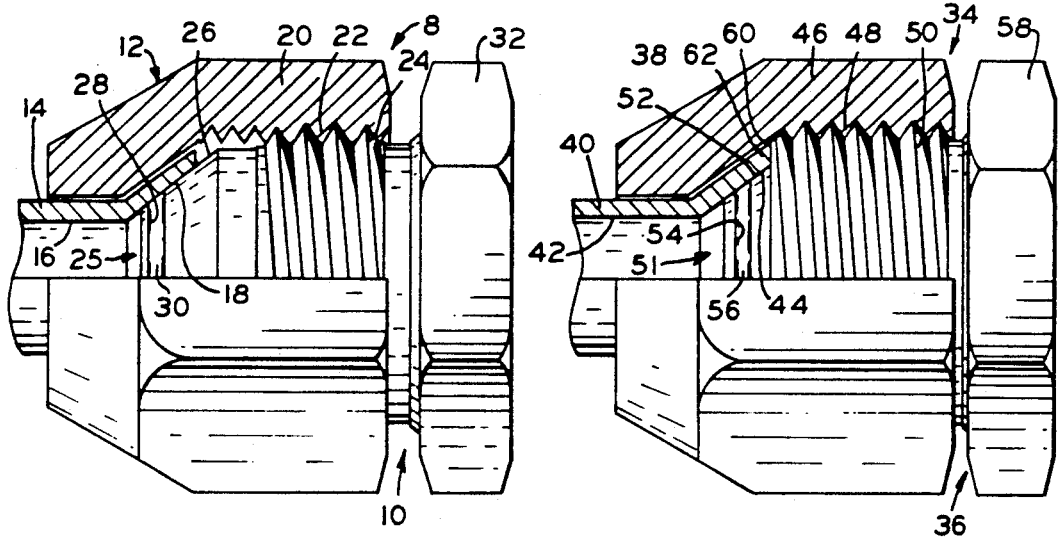
FIG_1 PRIOR ART    FIG_2
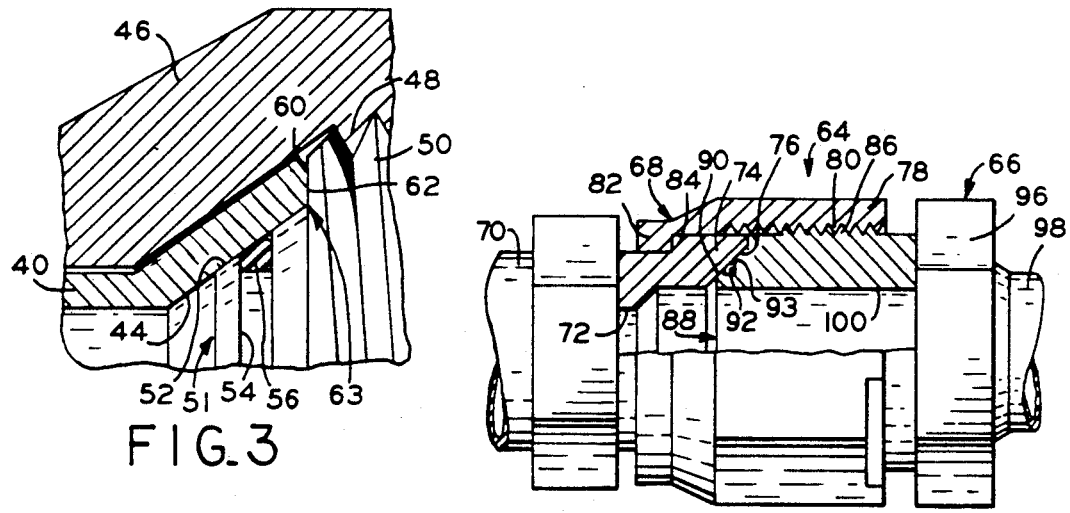
FIG_3    FIG_4
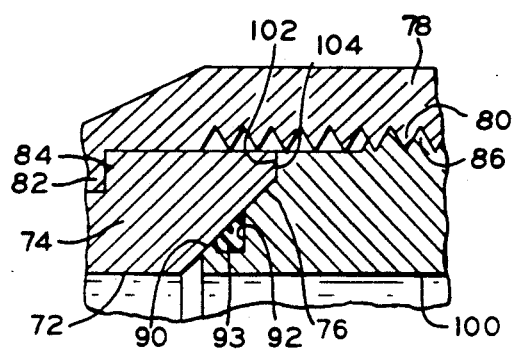
FIG_5

HYDRAULIC FITTING WITH O-RING SEAL END STOP

BACKGROUND OF THE INVENTION

The present invention relates to adapters for hydraulic hoses and tubes, particularly those used in high pressure environments. More particularly, the present invention is concerned with a hydraulic hose adapter, for attaching a threaded coupling to a hose or tubing, which uses an 0-ring and a stop for improving the fluid seal.

U.S. Pat. No. 4,458,926 discloses a hydraulic hose adapter, and is hereby explicitly incorporated by reference herein. The hose coupling, known as a "Flare-0" fitting, includes centrally bored male and female members and an internally threaded sleeve. The female member rotatably receives the male member, which is engaged by the sleeve. The female and male members are provided with smooth, frustoconical, metal female and male seating surfaces, respectively. The male seating surface is interrupted by a circular groove. The cross sectional area of the groove is greater than that of the 0-ring. The 0-ring is made of deformable but non-compressible material, and the groove is positioned so that the female seating surface contacts the male seating surface on each side of the groove.

A problem with this prior art fitting involves "nose collapse". "Nose collapse" occurs when the male taper seat is driven down, under heavy torque, inside the taper of the female component. The collapse of the nose of a male fitting is directly related to the amount of the linear travel of the male component once engaged with the female tapered surface. The reduction in diameter is related to linear distance traveled as a function of the angle of the taper, conventionally 37° or 45°. With the 37° fittings, the nose collapse is 1.5071 of the diameter for each 1.0 of linear travel. Therefore, if an installer tightens the fitting by 0.030" in a linear direction, the bore diameter would be reduced by approximately 0.045", which is a significant reduction on smaller sizes of fittings. A deformed nose does not necessarily cause malfunctions within the fitting, but the deformation is not a desired feature.

One method of avoiding the nose collapse problem is to remove the leading portion of the nose ahead of the 0-ring, but such a reduction would reduce the functionality of the fitting. What is needed in the art is a fitting of the type described above which overcomes the problem of nose collapse without impairing the functionality of the coupling.

SUMMARY OF THE INVENTION

The present invention is an adjustable hydraulic coupling with an 0-ring seal and a stop wall for limiting the range of adjustment. The male fitting includes a tapered locking surface for engagement with a tapered locking surface of the female fitting, and a groove is located in the male tapered locking surface which provides a location for an 0-ring. A wall which provides a stop is located o the male fitting intermediate the male tapered locking surface and its threads.

The male fitting of the coupling includes a stop wall adapted to abut the annular edge of the female fitting and thus limit the amount of axial pressure exerted on the nose of the male fitting. The stop wall still allows close contact between the male and female fittings to form an interface which resists loosening of the male fitting due to vibration and hydraulic forces.

An advantage of the present invention is that the nose portion of the male fitting is protected against "nose collapse" when the male tapered locking surface is driven down, under heavy torques, inside the taper of the female fitting.

Another advantage of the present invention is the increased amount of pressure which can be maintained with a hydraulic coupling of the present invention. With the threads of the male fitting starting at the point above the stop wall, the threading engagement length is considerably greater than in the prior art fitting, and a proportional increase in tensile strength is derived.

DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 1 is a side elevational view, in partial cross-section, of a prior art hydraulic fitting;

FIG. 2 is a side elevational view, in partial cross-section, of a hydraulic fitting with an 0-ring seal and stop of the present invention;

FIG. 3 is an enlarged view, in partial cross-section, of the fitting of the present invention showing the stop wall;

FIG. 4 is a side elevational view, in partial cross-section, of an alternative embodiment of the present invention; and FIG. 5 is an enlarged view, in partial cross-section, of the land and stop wall of the embodiment of FIG. 4.

Corresponding reference characters indicate corresponding parts throughout the several views. The exemplifications set out herein illustrate a preferred embodiment of the invention, in two forms thereof, and such exemplifications are not to be construed as limiting the scope of the disclosure or the scope of the invention in any manner.

DETAILED DESCRIPTION OF THE PREFERRED EMBODIMENT

The present invention can be better understood by comparison with the prior art hydraulic fitting shown in FIG. 1. Hydraulic coupling 8 includes male fitting 10 and female fitting 12. Female fitting 12 is preferably a standard female part of a coupling known in the art as a JIC 37° FLARE or a SAE 45° FLARE coupling.

Female fitting 12 includes and is connected to the flared end of conduit 14 with central bore 16 and a smooth, female tapered locking surface 18 which flares at an angle relative to bore 16. Positioned about the outer periphery of conduit 14 is sleeve 20 which includes internal threads 22. Sleeve 20 is secured to and freely rotatable around conduit 14.

External threads 24 of male fitting 10 engage threads 22 of sleeve 20. The nose 25 of male fitting 10, which extends into sleeve 20, includes a male tapered locking surface 26 having a groove 28 for positioning 0-ring 30. The cross-sectional area of groove 28 is preferably greater than 100% and less than or equal to about 125% of the area of O-ring 30. For example, groove 28 could be less than or equal to about 105% or 110% of O-ring 30. On the other end, adapter or hex head 32 is located for coupling with a hydraulic line (not shown). Male fitting 10 also has an internal bore (not shown) which aligns coaxially with bore 16 of female fitting 12.

A problem with hydraulic coupling 8 is that male tapered locking surface 26 can be deformed because of heavy torque applied during tightening the fitting wherein male fitting 10 is axially forced into female fitting 12 when tapered locking surfaces 18 and 26 are already abutting.

The present invention is shown in FIG. 2, where hydraulic coupling 34 includes male fitting 36 and female fitting 38, the latter being identical to fitting 12 of FIG. 1. Female fitting 38 includes and is connected to the flared end of conduit 40 with central bore 42 and a smooth, female tapered locking surface 44 which flares at a angle relative to bore 42. Positioned about the outer periphery of conduit 40 is sleeve 46 which includes internal threads 48. Sleeve 46 is secured to and freely rotatable around conduit 40.

External threads 50 of male fitting 36 engage threads 48 of sleeve 46. The end of male fitting 10, which extends into sleeve 46, includes male tapered locking surface 52 having a groove 54 for positioning 0-ring 56. On the other end, adapter or hex head 58 is located for coupling with a hydraulic line (not shown). Male fitting 36 also has an internal bore (not shown) which aligns coaxially with bore 42 of female fitting 38.

In accordance with one form of the present invention stop wall 60 is provided for limiting the axial movement of male fitting 36. Stop wall 60 extends radially outward from male tapered locking surface 52, to external threads 50. When male fitting 36 is threaded into sleeve 46, eventually outer end 62 of conduit 40 abuts stop wall 60 of male fitting 36, which stops any further linear movement. No further movement is possible even when excess torque is applied because the abutting faces 60 and 62 limit further travel. Further, an assembler of the fitting will be able to sense by feel when the fittings are properly assembled.

The present invention may be utilized within the envelope dimensions of the standard male fitting, and therefore no other changes to the other components in the hydraulic system are required. To ensure good abutment of the male and female tapered locking surfaces 52 and 44, the "breakout diameter" of the female tapered locking surface must be accurately defined. In order to prevent nose collapse, the axial gap between the axial end 62 of tube 40 and surface (FIG. 3) should be no greater than 0.020 inches. This gap is preferably in the range of 0.005 inches to 0.020 inches. This is the gap that occurs as a result of interference fit between the two mating parts when no torque is supplied, that is, when the breakout diameter 63 contacts tapered surface 52. Also, the present invention allows much greater hydraulic pressure to be utilized. However, if such higher pressures are utilized, other components may need to be strengthened to accommodate the greater pressures. Suitable materials for fittings 36 and 38 are well known and include mild stainless steels, aluminum, brass and the like.

An alternative embodiment of the present invention is shown in FIG. 4, where hydraulic coupling 64 includes male fitting 66 and female fitting 68. Female fitting 68 is preferably a standard female part of a coupling known in the art as a JIC 37° FLARE or a SAE 45° FLARE coupling.

Female fitting 68 includes a conduit 70 with central bore 72 and an annular end portion 74 having a smooth, female tapered locking surface 76 which is cut at an angle relative to bore 72. Positioned about the outer periphery of end portion 74 is sleeve 78 which includes internal threads 80. Sleeve 78 has a land 82 which is positioned on shoulder 84 of end portion 74, which secures sleeve 78 yet allows it to be freely rotatable around end portion 74.

External threads 86 of male fitting 66 engage threads 80 of sleeve 78. The nose 88 of male fitting 66, which extends into sleeve 78, includes a male tapered locking surface 90 having a groove 92 for positioning 0-ring 94. On the other end, adapter or hex head 96 is located for coupling with hydraulic line 98. Male fitting 66 also has an internal bore 100, which aligns coaxially with bore 72 of female fitting 68.

In accordance with one form of the present invention, stop wall 102 (FIG. 5) is provided as a stop for the axial movement of male fitting 66. Stop wall 102 extends radially outward from male tapered locking surface 90, to external threads 86. When male fitting 66 is threaded into sleeve 78, eventually outer end 104 of conduit 70 abuts stop wall 102 of male fitting 66, which stops any further linear movement. No further movement is possible even when excess torque is applied because the abutting faces 102 and 104 limit further travel. Further, an assembler of the fitting will be able to sense by feel when the fittings are properly assembled.

While this invention has been described as having a preferred design, it can be further modified within the teachings of this disclosure. This application is therefore intended to cover any variations, uses, or adaptations of the invention following its general principles. This application is also intended to cover departures from the present disclosure as come within known or customary practice in the art to which this invention pertains and which fall within the limits of the appended claims.

What is claimed is:

1. A hydraulic coupling, comprising:
a female fitting member having a central bore having a central axis, a tapered locking surface, and an annular end portion;
an internally threaded sleeve rotatably secured to said female member; and
an externally threaded male fitting member with external threads engaging said internal threads of said sleeve, said male member having a central bore coaxial with said bore of said female member, a male tapered locking surface complementary to said female tapered locking surface, an annular groove in said male tapered locking surface in which side walls of said groove are directed substantially perpendicular to the axis of said bore with one side of said groove having a greater depth than the other side, an O-ring of deformable and non-compressible material in said groove, the cross-sectional area of said groove being larger than that of said O-ring, said O-ring having a cross-sectional height which is greater than the minimum depth of said groove and extending beyond an imaginary frustoconical surface connecting the minimum and greater depth sides of said groove when undeformed, said O-ring having a size and shape with respect to the size and shape of said groove such that said O-ring is deformed towards the greater depth side of said groove, said groove being positioned so that said female tapered locking surface sealingly contacts said male tapered locking surface on each side of said groove with no portion of said O-ring being between said male and female tapered locking surfaces, said male member having a thickness between said central bore and the bottom of said groove sufficient to withstand the pressure exerted through said O-ring without deformation of said male member, said tapered locking surfaces being smooth;

said sleeve having a first abutment surface that abuts a second abutment surface on said female member in the axial direction to urge said tapered locking surfaces together;

said male member including a stop wall located between said external threads and said male tapered locking surface, said stop wall adapted to engage said annular end portion thereby to limit axial movement of said male member in said sleeve and in said female member, said male and female members and said sleeve being dimensioned such that said abutment surfaces abut each other at about the same time as said stop wall and annular end portion abut each other as said fitting is assembled, there being substantially no further relative movement between said male and female members and said sleeve after abutment of said stop wall and said female fitting annular end portion and abutment of said first and second abutment surfaces, so as to avoid deformation of said male fitting member.

2. The hydraulic coupling of claim 1 wherein the cross-sectional area of said groove is no greater than 110% of that of said 0-ring.

3. The hydraulic coupling of claim 2 wherein the crosssectional area of said groove is about 105% of that of said 0-ring.

4. The hydraulic coupling of claim 1 wherein said 0-ring has a circular cross-section.

5. The hydraulic coupling of claim 4 wherein said groove has a flat bottom.

6. The hydraulic coupling of claim 1 wherein the angle of said male and female tapered locking surfaces is about 37°.

7. The hydraulic coupling of claim 1 wherein the angle of said male and female tapered locking surfaces is about 45°.

8. The hydraulic coupling of claim 1 wherein the locking surface of said female member is a flared end of conduit.

9. The hydraulic coupling of claim 8 wherein said male member is a male member from a standard JIC o SAE Flare coupling, modified by having said groove cut in its male tapered locking surface.

10. The hydraulic coupling of claim 1 wherein said groove has a flat bottom.

11. A hydraulic coupling, comprising:
a female fitting member having a central bore having a central axis, a tapered locking surface, and an annular end portion;

an internally threaded sleeve rotatably secured to said female member; and an externally threaded male fitting member with external threads engaging said internal threads of said sleeve, said male member having a central bore coaxial with said bore of said female member, a male tapered locking surface complementary to said female tapered locking surface, an annular groove in said male tapered locking surface in which side walls of said groove are directed substantially perpendicular to the axis of said bore with one side of said groove having a greater depth than the other side, an O-ring of deformable and noon-compressible material in said groove, the cross-sectional area of said groove being greater than 100% and no greater than 125% of that of said O-ring, said O-ring having a cross-sectional height which is greater than the minimum depth of said groove and extending beyond an imaginary frustoconical surface connecting the minimum and greater depth sides of said groove when undeformed, said O-ring having a size and shape with respect to the size and shape of said groove such that said O-ring is deformed towards the greater depth side of said groove by said female tapered locking surface, said groove being positioned so that said female tapered locking locking surface sealingly contacts said male tapered locking surface on each side of said groove with no portion of said O-ring being between said male and female tapered locking surfaces, said male member having a thickness between said central bore and the bottom of said groove sufficient to withstand the pressure exerted through said O-ring without deformation of said male member, said tapered locking surfaces being smooth;

said sleeve having a first abutment surface that abuts a second abutment surface on said female member in the axial direction to urge said tapered locking surfaces together;

said male member including a stop wall located between said eternal threads and said male tapered locking surface, said stop wall adapted to engage said annular end portion in edgewise axial abutment thereby to limit axial movement of said male member in said sleeve and said female member, said male and female members and said sleeve being dimensioned such that said abutment surfaces abut each other at about the same time as said stop wall and annular end portion abut each other as said fitting is assembled, there being substantially no further relative movement between said male and female members and said sleeve after abutment of said stop wall and said female fitting annular end portion and abutment of said first and second abutment surfaces, so as to avoid deformation of said male fitting member.

* * * * *